United States Patent
Haub et al.

(10) Patent No.: US 7,295,813 B2
(45) Date of Patent: Nov. 13, 2007

(54) CURRENT REDUCTION BY DYNAMIC RECEIVER ADJUSTMENT IN A COMMUNICATION DEVICE

(75) Inventors: David R. Haub, San Diego, CA (US); James David Hughes, Boynton Beach, FL (US)

(73) Assignee: Motorola Inc., Schaumburg, IL (US)

( * ) Notice: Subject to any disclaimer, the term of this patent is extended or adjusted under 35 U.S.C. 154(b) by 222 days.

(21) Appl. No.: 10/630,124

(22) Filed: Jul. 30, 2003

(65) Prior Publication Data
US 2005/0026564 A1 Feb. 3, 2005

(51) Int. Cl.
*H04B 1/10* (2006.01)
*H04B 1/06* (2006.01)
*H04B 17/00* (2006.01)

(52) U.S. Cl. ............................... 455/67.13; 455/67.11; 455/226.1; 455/278.1; 455/295; 455/296

(58) Field of Classification Search ............. 499/67.11, 499/115.1, 226.1–226.4, 102, 116, 123, 232.1, 499/234.1–234.2, 250.1, 295–296, 63.1, 499/277.2, 278.1; 330/278; 341/139–143, 341/304
See application file for complete search history.

(56) References Cited

U.S. PATENT DOCUMENTS

| 5,748,129 | A | 5/1998 | Tsumura |
| 6,009,129 | A | 12/1999 | Kenney et al. |
| 6,311,048 | B1 | 10/2001 | Loke |
| 6,668,164 | B2 * | 12/2003 | Hughes .................... 455/234.1 |
| 6,670,901 | B2 * | 12/2003 | Brueske et al. .............. 341/139 |
| 2004/0038656 | A1 * | 2/2004 | McCall et al. .............. 455/138 |
| 2005/0075077 | A1 * | 4/2005 | Mach et al. ............. 455/67.13 |

FOREIGN PATENT DOCUMENTS

| WO | WO 99/45653 A1 | 9/1999 |
| WO | WO 00/17400 A1 | 3/2000 |
| WO | WO 00/18023 A1 | 3/2000 |
| WO | WO 02/13402 A3 | 2/2002 |
| WO | 2004042937 A2 | 5/2004 |

* cited by examiner

*Primary Examiner*—Pablo N. Tran
(74) *Attorney, Agent, or Firm*—Brian M. Mancini; Sylvia Chen (57) ABSTRACT

A method for reducing current drain in a communication device includes a first step of detecting interference including intermodulation and crossmodulation products. A next step includes determining a frequency offset of the interference with reference to the operating receiver band. A next step includes measuring a power level of the interference. A next step includes calculating a receiver linearity required to achieve a desired signal-to-interference ratio. A next step includes adjusting the receiver linearity in order to achieve the desired signal-to-interference ratio. Optionally, the receiver dynamic range can be adjusted to suit the reduced signal swing due to the reduced linearity.

14 Claims, 7 Drawing Sheets

FIG. 1 —PRIOR ART—

—PRIOR ART—

CURRENT REDUCTION BY DYNAMIC RECEIVER ADJUSTMENT IN A COMMUNICATION DEVICE

FIELD OF THE INVENTION

The present invention generally relates to reducing power consumption in a communication device such as a radiotelephone. More particularly, the present invention relates to a technique for dynamic adjustment of receiver elements in radiotelephone device.

BACKGROUND OF THE INVENTION

Code Division Multiple Access (CDMA) and Wideband CDMA (WCDMA) receivers in North American bands have been and will continue to coexist with other narrow band systems such as AMPS, IS136, and Global System for Mobile (GSM) communication system. This situation leads to narrow band interference signals that cause both crossmodulation and intermodulation non-linear distortions. The traditional method to mitigate the distortion is to operate with sufficiently high linearity at the expense of additional current drain. Additionally, receiver designs are migrating to higher dynamic range analog-to-digital converters (A/Ds) with digital filters and less analog filtering. This type of receiver design therefore passes both the desired signal and interference through a set of high dynamic range circuit elements before final elimination of the interference by digital filters. Again, the dynamic range of these circuit elements (A/Ds and filters) is set sufficiently high to accommodate the largest expected interference at the expense of current drain and battery life. These two factors cause receivers to operate with higher current drain than needed under the majority of usage conditions.

Interference is a particular problem in CDMA systems which require the receiver and transmitter to be on continuously. An example of such a specification is Telecommunications Industry Association/Electronic Industry Association (TIA/EIA) Interim Standard IS-95, "Mobile Station-Base Station Compatibility Standard for Dual-Mode Wideband Spread Spectrum Cellular System" (IS-95). IS-95 defines a direct sequence code division multiple access (DS-CDMA or CDMA) radiotelephone system. In a CDMA system, the receiver must be on continuously in order to receive incoming data while on a traffic channel and the transmitter must be on continuously while on a traffic channel.

Prior art receiver linearity systems dynamically adjust the linearity of a receiver based on detection of poor received signal quality based on carrier-to-interference ratio (Ec/Io) or FER (frame error rate), knowledge of the transmit level, and received signal strength indications (RSSI). Also, the prior art captures the various ways that linearity can be changed, i.e. either gain change or current change in receiver amplification stages. However, the prior art does not make the most efficient use of current drain since the linearity is potentially increased without any knowledge of the interference. Poor quality can be caused by a number of factors that are not related to receiver linearity and thus is not the most efficient metric. Furthermore, the prior art does not address the use of variable dynamic range in the baseband.

In another technique, the quality metric shortcoming is somewhat addressed by performing a spectral estimation of the in-band signal. This spectral estimation is performed in post-channel filtering to look for narrowband intermodulation distortion products and a low-noise amplifier (LNA) bypass is used to improve receiver linearity. Note that this addresses potential intermodulation products but does not consider crossmodulation. Also, the mitigation is limited to LNA bypass and thus limits the optimization of performance near sensitivity. Furthermore, detection of the intermodulation products is much more difficult than detection of the interference since the intermodulation products are several dB lower in amplitude than the actual interference.

Dynamic control of A/D converter dynamic range is also known, wherein an analog detected voltage is used to vary an A/D's dynamic range. The variable control of converter range is often internal to the A/D and is not part of a larger system. This limits the efficacy of the techniques to mitigation of narrow-band interferer by the A/D and does not provide a mechanism to reduce the current drain of the other circuit elements, e.g. digital filters, analog filters, and RF circuits.

Accordingly, there is a need for a method and apparatus for reducing current drain in a communication device such as a radiotelephone when mitigating non-linear distortion effects. There is a further need to reduce the current drain by the receiver in a communication device operating in a CDMA system, without sacrificing the ability to receive incoming signals. It would also be of benefit to provide these advantages without additional hardware, which would increase the cost of the communication device.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

FIG. 6 is a flow chart illustrating the operation of the device of FIG. 5; and.

DETAILED DESCRIPTION OF A PREFERRED EMBODIMENT

The present invention provides a unique method to improve reception in a receiver circuit for a wireless communications device in a communication system while reducing current drain. This is done by reducing the current drain in the receiver by making the elements in the receiver (mixers, amplifiers and filters) less linear when there is little or no interference, and increasing linearity again when interference exists. In particular, the present invention reduces the effects of intermodulation distortion and cross-modulation distortion by direct determination of the interference, instead of relying on channel quality, and by improving linearity of the receiver only when non-linear distortion products are anticipated. This improvement is accomplished without any significant additional hardware or cost in the communication device. Moreover, the present invention can take advantage of existing high dynamic range devices such as analog-to-digital converters and digital filters in combination with solutions for processing of the RF input signals necessary in the communication device.

Specifically, the present invention resolves the problems of the prior art by using in-band and out-of-band interference detection and spectrum estimation to identify the power level and frequency offsets of interference to decide if linearity reduction is performed, rather than using a CDMA channel quality metric or for use in a GSM environment (e.g. for cross modulation or intermodulation issues). Further, the present invention can also utilize dynamic range reduction to the same effect and linearity adjustments, wherein dynamic range adjustments and linearity adjustments can be used separately or in combination.

Figure 1:
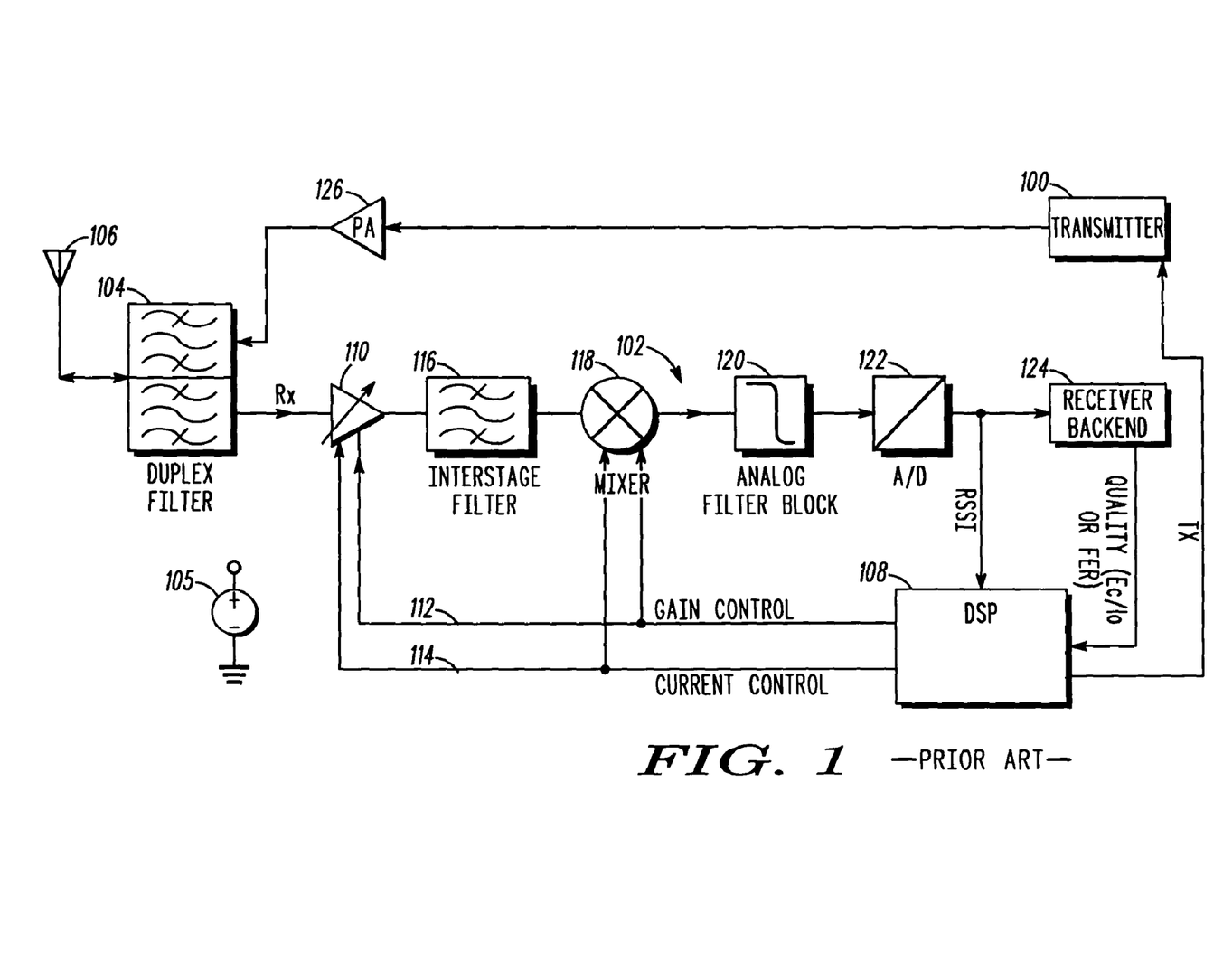
FIG. 1 shows a block diagram of a prior art multimode communication device.

Turning to FIG. 1, a block diagram of a prior art communication device is shown. Typically, this device is a duplex CDMA cellular radiotelephone operable in a CDMA radiotelephone system operating according to TIA/EIA Interim Standard IS-95, "Mobile Station-Base Station Compatibility Standard for Dual-Mode Wideband Spread Spectrum Cellular System," operating at 800 MHz. Alternatively, the radiotelephone system 100 could operate in accordance with other CDMA systems including PCS systems at 1800 MHz or with any other suitable digital radiotelephone systems. The device includes an antenna 106 coupled to a transmitter 100 and a receiver circuit 102, which can communicate simultaneously, although in different frequency bands, through a duplexer filter 104 with an antenna 106. The device is controlled by one or more of a microprocessor (not shown), microcontroller, or digital signal processor 108 (DSP), which generate the necessary communication protocol for operating in a compatible cellular system and can perform many other devices that provide functions for the wireless communication device, such as writing to a display, accepting information from a keypad, communicating through a user interface, audio, etc. These other devices are not shown for simplicity of the figures and to avoid confusion. A battery 105 provides operating power to the other components of the radiotelephone. Preferably, the battery is rechargeable.

The antenna 106 receives RF signals from a base station 102 in the vicinity. The received RF signals are converted to electrical signals by the antenna 106 and provided to the receiver 102, which provides conversion to baseband signals. The receiver 102 includes an amplifier and other circuitry, such as RF circuits and demodulation circuitry, as is known in the art. The baseband signals are provided to the other circuits (not shown) in the radiotelephone, which converts them to streams of digital data for further processing.

Similarly, the radiotelephone provides baseband signals through modulation circuitry to the transmitter 100, which sends electrical RF signals to the antenna 106 for transmission to the base station and other base stations in the vicinity. The amplifier 126 typically consumes the most current drain while on a traffic channel although techniques exist to reduce this at lower transmit levels. At lower transmit levels, the current consumption of the various receiver 102 elements becomes more critical to the radio current drain. Additionally, the current drain while monitoring a paging channel is greatly impacted by the current drain of receiver 102 since the amplifier 126 and transmitter 100 are turned off.

The control circuitry, such as DSP 108, controls functions of the radiotelephone 104. The control circuitry operates in response to stored programs of instructions and includes a memory (not shown) for storing these instructions and other data. The control circuitry is also coupled to other elements of the radiotelephone, which are not shown so as to not unduly complicate the drawing. For example, the radiotelephone will typically include a user interface to permit user control of the operation of the radiotelephone. The user interface typically includes a display, a keypad, a microphone and an earpiece. The user interface is coupled to the control circuitry.

The DSP 108 can control receiver linearity by adjusting a gain stage 110 and mixer 118 through a gain control 112 or a current control 114. The receiver circuit path also includes interstage filtering 116, analog filtering and analog-to-digital conversion 122 for the receiver backend 124, as are generally known in the art. The DSP 108 determines a received signal strength indication (RSSI) for the receiver channel. It should be recognized that RSSI can be determined in various separate blocks or combinations thereof (such as through an AGC system). The receiver backend 124 includes a demodulator, signal processing, and other circuitry known in the art to perform baseband conversion and appropriate active filtering which is necessary for demodulation of the desired communication signal. Also, the receiver backend 124 can use digital processing to determine a quality of the receiver channel (i.e. frame error rate (FER), Ec/Io (carrier-to-interference ratio), and the like).

The gain stage 110 is a pre-amp that uses automatic gain control (AGC) to control the signal gain input to the backend baseband circuit (demodulator) 124, since this circuit is susceptible to overload. The AGC maintains each stage's power level within the designed operating range so the receivers may function properly. The receiver circuit can be direct conversion or have one or more intermediate frequency stages. The mixer 118 converts the signal into a baseband representation which is then subsequently filtered 120 by a baseband filter that allows primarily the desired communication signal to pass for further processing. Although filtered, the signal, plus noise, interference and intermodulation are present. Some of these signals are on the desired communication signal frequency band, such as intermodulation products generated due to crossmodulation with the co-transmitting power amplifier 126, and are passed on to further processing. After the filter 120, the signal is converted to a digital signal by the analog-to-digital converter 122. This converter takes all signals (desired communication signal and interference) and converts them to digital data bits which are then further processed including additional filtering and demodulation.

The digital signal processor 108 comprises a detector for detecting on-band interference from all sources including self-interference from the transmitter power amplifier 126 as well as external channel noise. The detector estimates the channel quality and the received signal strength to determine the proper amount of gain or current to supply to the gain stage 110 and mixer 118 to adjust the linearity thereof for reduced crossmodulation. It should be recognized that many of these stages can be incorporated solely in software without need for hardware embodiments.

Figure 2:
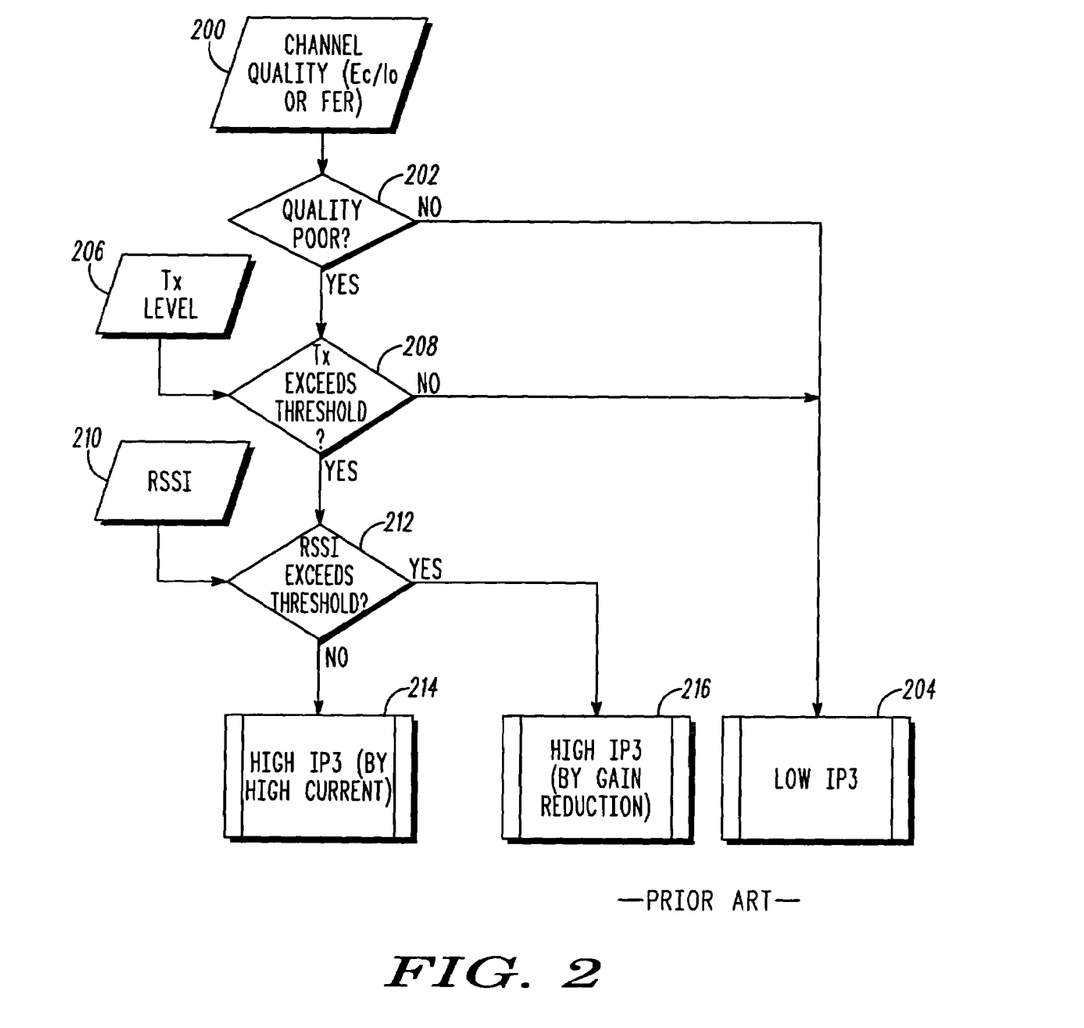
FIG. 2 is a flow chart illustrating the operation of the device of FIG. 1.

FIG. 2 shows a prior art technique for linearity adjustment for intermodulation reduction, used with the device of FIG.

1. The device first determines a received channel quality 200 using techniques known in the art. If the channel quality is good 202 then the effect of intermodulation and other noise sources are not significant and the device can operate nominally 204. However, if the channel quality is poor then intermodulation can be one of the causes. In this case, the transmitter power amplifier level is used and compared against a first threshold 208 that is empirically determined and is a function of system design. If the power level does not exceed the first threshold then the interference or distortion will not be anticipated as significant and the device can operate nominally 204. However, if the transmitter power level exceeds the threshold then crossmodulation can be the cause, and the prior art then calls for a linearity adjustment of the low-noise amplifier (LNA) and mixer.

What type of linearity adjustment to be used is decided by determining 210 a received signal strength indication (RSSI) and compared the RSSI with a second empirically determined threshold 212 to determine the type of operating condition adjustment (i.e. gain or linearity). In particular, if the RSSI is greater than the second threshold then there is sufficient signal present and a gain reduction would not further reduce the existing poor signal in relation to the interference, i.e. signal-to-interference ratio (S/I). In other words, if the signal were small (small RSSI), then S/(N+I) would be the proper representation, as a result of a gain reduction. The signal and interference would now be smaller, while noise is a constant and relatively larger. However, the distortion products within the receiver are reduced greatly by lowering a gain 216 of the gain stage 110 and mixer 118 of the receiver thus improving the existing poor signal in relation to the interference. Lowering the gain is preferred as current dissipation is typically reduced for reduced gain. However, if the RSSI is below or equal to the second threshold 212 (i.e. not enough signal) then lowering the gain would incur a more negative penalty, since there is not enough signal in the first place, and the linearity increasing adjustment is accomplished by increasing current 214 to the gain stage of the receiver.

The present invention is different in several respects from the above prior art. First, channel quality is not used for an intermodulation or a crossmodulation determination since channel quality can be degraded by many other causes than intermodulation or crossmodulation. Second, a frequency offset of the interference from the receiver band is determined and used in the linearity determination. And third, the power levels of the interference are used in evaluating whether to adjust linearity.

The present invention defines a method to reduce the receiver current drain during periods in which there is little or no interference, thus reducing the overall current consumption for the communication device. To operate within the IS-95 standard, a CDMA receiver must meet the specifications for two-tone intermodulation (IM) and single-tone desensitization (STD) defined in TIA/EIA-98. These two requirements set the linearity requirement for the receiver front end, which in turn sets its power consumption. The IM specification requires that the receiver front end be linear enough to reduce the level of on-channel third-order intermodulation product of two equally spaced continuous wave interferers. Further, the STD specification requires that the receiver front end be linear enough to reduce the level of an on-channel cross-modulation product of a continuous wave interferer and the radio's own transmit signal.

In the present invention, the linearity of the receiver 102 is controlled by a linear adjust signal from the control circuitry 108. The linear adjust signal controls the current flow to the receiver 102, and in particular the bias current to the receiver amplifier and mixer. The control circuitry 108 can also provide a gain adjust signal to the receiver 102. The gain adjust is independent of the linearity adjust and does not depend on current limiting. The gain required in the receiver is independent of whether the communication device is transmitting. At high gain, the receiver is more susceptible to interference and control of the receiver linearity becomes important, as described previously. Increasing the receiver linearity requires the receiver to use more current.

Figure 3:
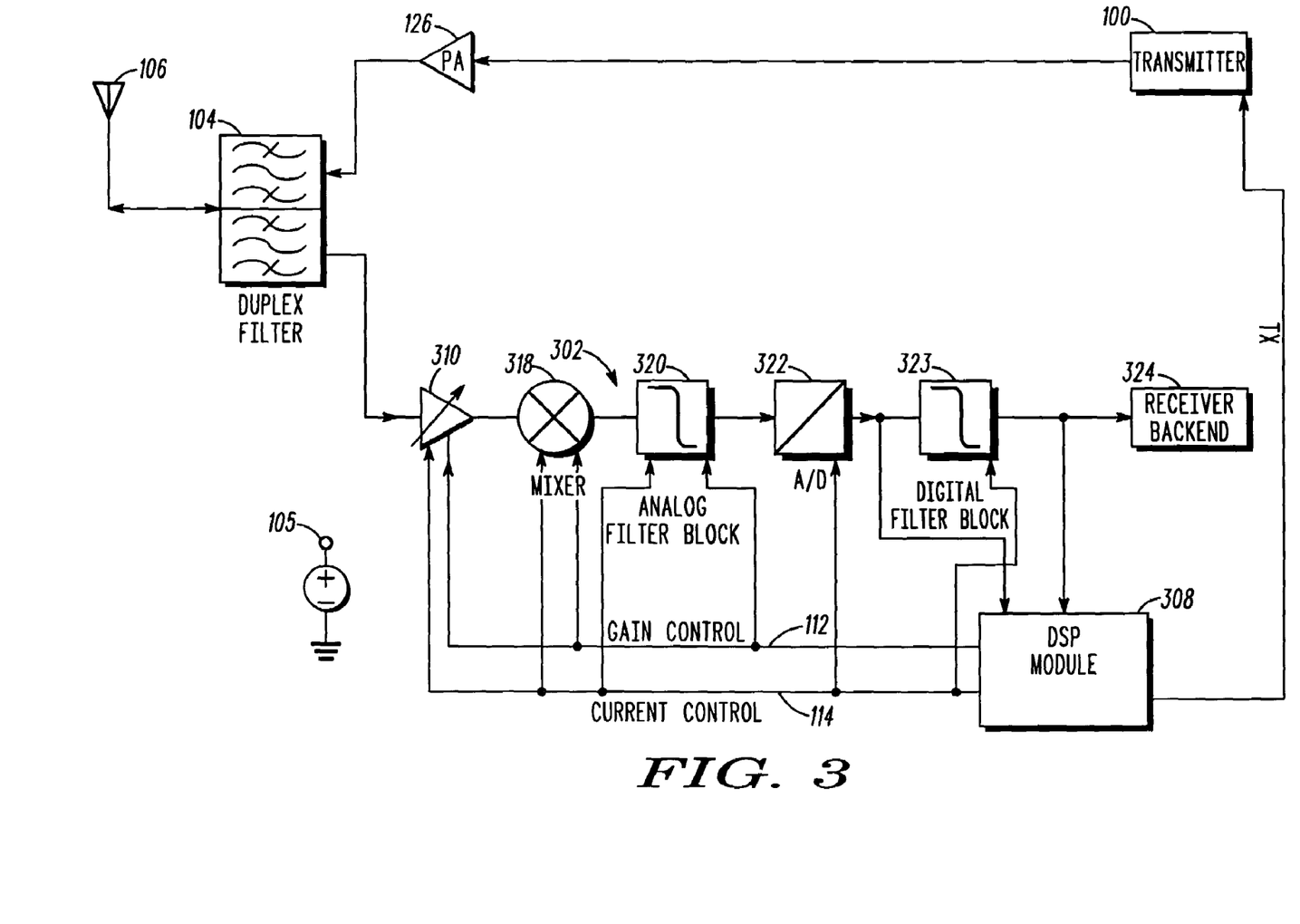
FIG. 3 shows a block diagram of a first embodiment of a multimode communication device, in accordance with the present invention.

Turning to FIG. 3, a block diagram is shown of a communication device, such as are operable in GSM and WCDMA communication systems, in accordance with the present invention. Preferably, this device is a cellular radio-telephone incorporating the present invention. The device includes a transceiver including a transmitter 100 as before and a receiver circuit 302, which can communicate simultaneously, although on different frequency bands, through a duplexer filter 104 with an antenna 106. The device is controlled by one or more of a microprocessor (not shown), microcontroller, or digital signal processor (DSP) module 308 (which can be a portion of the device DSP), which generates the necessary communication protocol for operating in a compatible cellular system and for performing many other functions for the wireless communication device, such as writing to a display, accepting information from a keypad, communicating through a user interface, audio, etc. (not shown for the simplicity). The DSP module 308 can control receiver linearity by adjusting its gain stage 310, mixer 318 and analog filter block 320 through a gain control 112 or a current control 114. The receiver includes a mixer 318, analog filtering block 320, an analog-to-digital converter (ADC) 322 for the receiver backend 324 and a digital filter block 323 after the ADC 322.

The present invention makes novel use of the high dynamic range, wide bandwidth ADC 322 that is different from the prior art since it allows out-of-band and high-level signal detection in addition to in-band signal detection. The DSP module 308 can determine out-of-band signals including interference, which are passed by the ADC 322. The power levels and frequency offsets of the interferers are ultimately used to determine linearity adjustments, as will be described below. The DSP module is in effect a detector for estimating non-linear distortion products due to intermodulation of multiple interferers or crossmodulation of the leakage from the device's PA 126 with an interferer. The detector can use the in-band and out-of-band signal products, as well as transmitter power level information from the PA 126 of the duplex transceiver, to determine the proper linearity adjustment for the gain stage(s) 310 and mixer(s) 318 and proper dynamic range for the A/D 322 and filter 323 for reduced distortion. Based on the interferer measurements and optionally the transmitter power level a signal-to-interference ratio can be calculated, wherein if the signal-to-interference ratio does not exceed a predetermined threshold, then the linearity of the receiver is increased using either increased current or gain change and/or dynamic range, as will be explained below.

Figure 4:
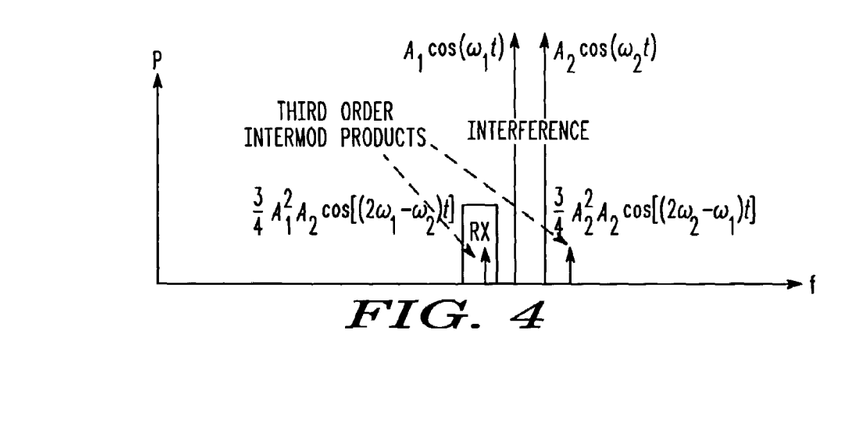
FIG. 4 is a flow chart illustrating the operation of the device of FIG. 3.

FIG. 4 shows a graph illustrating the effects of third-order intermodulation on a receiver (RX) band. In this example, a first interferer, $A_1 \cos(\omega_1 t)$, which is nearer to the RX band intermodulates with a second interferer, $A_2 \cos(\omega_2 t)$, which is farther from the RX band. This intermodulation produces third-order products within the RX band that degrades signal-to-interference performance (as well as third-order products outside of the band). In particular, the third-order interference is $$v_{imd3}(t) = \frac{3}{4} A_1^2 A_2 \cos\left[(2\omega_1 - \omega_2)t\right] + \frac{3}{4} A_2^2 A_1 \cos\left[(2\omega_2 - \omega_1)t\right] \quad (1)$$

and the signal-to-interference ratio is $$\frac{P_{sig}}{P_{imd}} = \frac{P_{sig}}{2P_1 + P_2 - 2IP_3} \quad (2)$$

where $P_{sig}$ is the power of the desired in-band (RX) signal and $P_{imd}$ is the power of the interference. $P_1$ is the power level of the nearer interferer, and $P_2$ is the power level of the farther interferer. In the present invention, the power and frequency offsets of the interferers are measured directly to determine their effect within the RX band. With a given signal-to-interference ratio (SIR) limit (as defined in the standard), an $IP_3$ threshold can then be found to provide sufficient SIR. The components of the receiver can then have their linearity adjusted to provide sufficient SIR.

Figure 5:
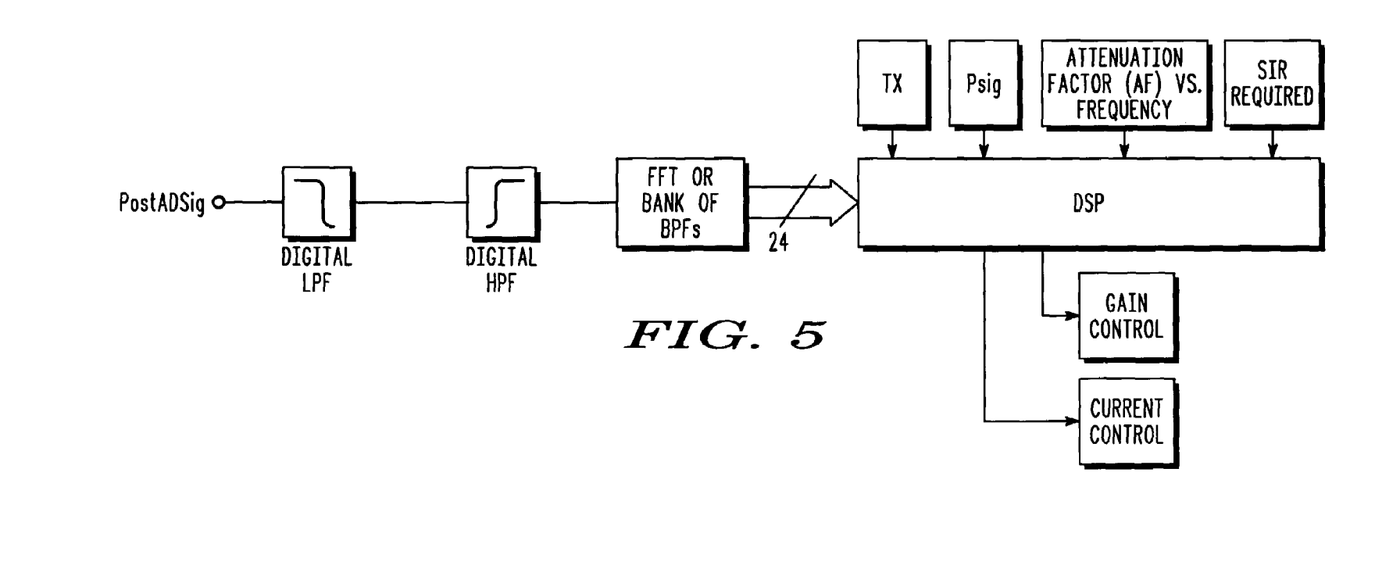
FIG. 5 shows a block diagram of an alternate embodiment of a multimode communication device, in accordance with the present invention.

FIG. 5 shows the DSP module (308 in FIG. 3) as used to detect interference and estimate intermodulation distortion, in accordance with the present invention. In this case, the non-linear distortion that is produced is in a relatively narrowband. The DSP uses inputs of the measured transmitter power (TX) and the received signals level ($P_{sig}$) as well as the required SIR. Then, given the measurements of the interferers, can calculate an $IP_3$ threshold from equation 2, to produce the desired SIR. In particular, the present invention uses spectral estimation to decide if any significant intermodulation products from narrowband interference will fall inside the receive channel filter. The dynamic range of the A/D converter and digital baseband can be relaxed if the spectral estimation indicates that no interference exists.

In practice, interferers are detected through the wideband A/D by measuring a spectrum across and outside of the RX band. In particular, the signal out from the A/D is passed to a digital lowpass filter that reduces the frequency range of detection (where crossmodulation and typical worst case intermodulation is a concern) and to reduce quantization noise of the A/D. This signal is then passed to a digital highpass filter that is the inverse of the analog low pass filter (320) to equalize the signal amplitude. This received signal spectrum can be provided through a Fast Fourier Transform (FFT) or through a bank of bandpass filters (BPF) covering the desired spectrum. The FFT size or BPF bandwidth is set by a desired frequency resolution, and the number of points can be set by the desired frequency range. In addition, many other techniques known in the art can be used to provide this spectrum measurement. Additionally, other methods exist to equalize the signal amplitude such as simple addition of the inverse analog low pass filter (320) transfer function after spectral estimation. In this example, a set of twenty-four bandpass filters are used to cover the range of the spectrum to find the interference. The power levels of the interference (as well as the frequency offsets as will be detailed below) are used in by the DSP in equation 2, to calculate the proper linearity (predetermined empirically) of the receiver components to provide at least a minimum SIR for proper reception by the communication device. Linearity is adjusted by either or both of a current control and gain control to the mixer and/or amplifier, thereby mitigating the waste of battery current.

In a preferred embodiment, if the signal level in the various receiver components is reduced (i.e. lower signal swing), there is no need to provide full dynamic range in the various components of the receiver to accommodate this reduced signal. Therefore, in the present invention, the dynamic range of these components can be reduced to track the linearity requirements of the LNA and mixer to further save current. In particular, current control can be used to control the dynamic range of one or more of the analog filter block (320), A/D (322) and digital filter block (323).

Figure 6:
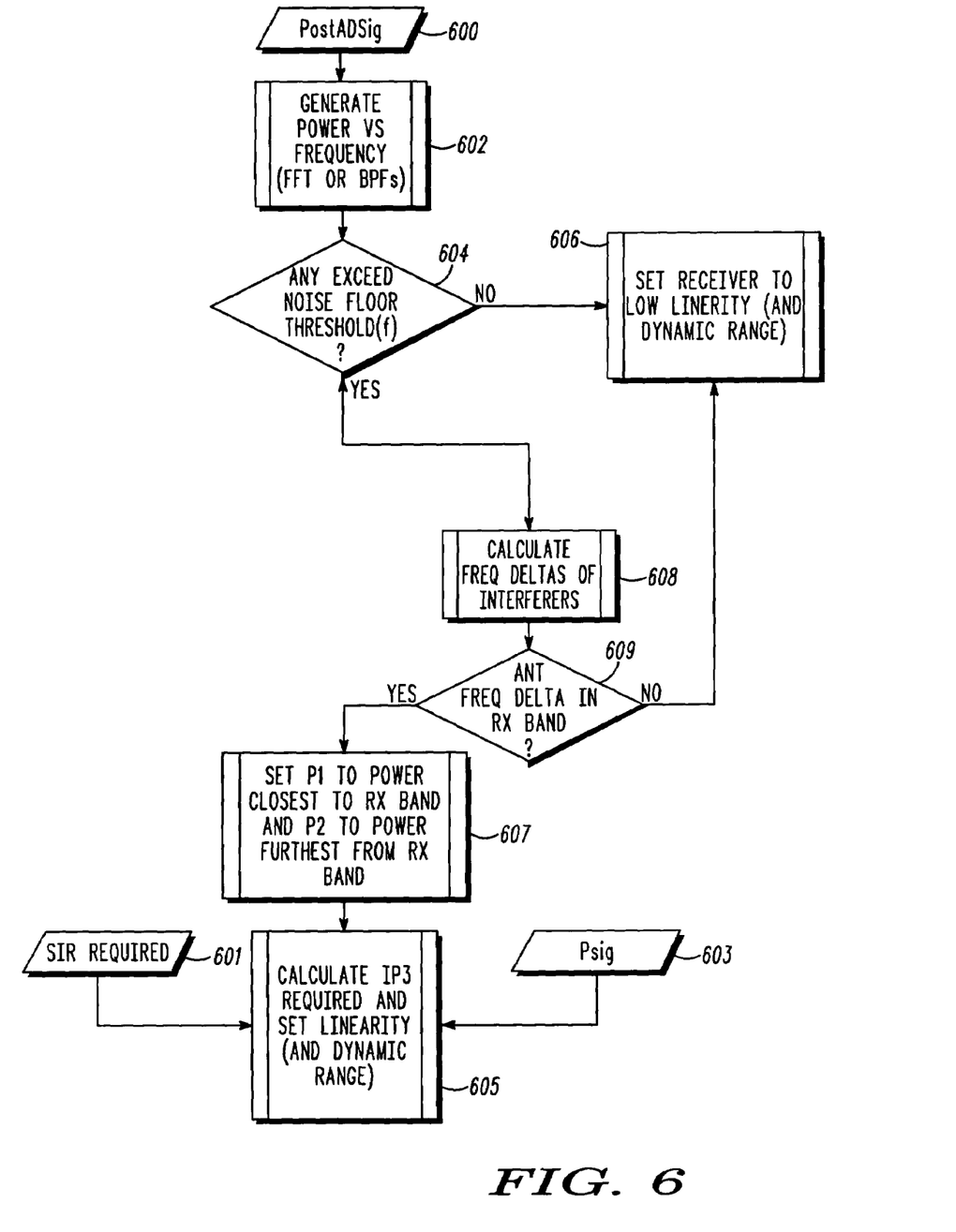

FIG. 6 illustrates a method to mitigate the effects of third-order intermodulation distortion, in accordance with the present invention. Referring to FIGS. 3-6, a first step 600 includes inputting the wideband signal from the A/D 322. From this signal, a noise power spectrum is generated 602 using FFT or a bank of BPFs as described above. The noise power spectrum can be determined under many conditions including during periods of non-communication with the receiver, during periods with the transmitter on (or off), and during several periods using an average of several measurements. A next step 604 includes detecting any interference products, which are found by measuring if any of the FFT bins or bandpass filters in the bank have a noise power level above a predetermined threshold indicating interference is present. The predetermined threshold is determined empirically from the final linearity requirements of the receiver. The threshold can be a constant level or a curve tailored for the particular RX band. If none of the bins of filters present an interference noise power over the threshold, then interference is not considered a problem for device reception. In this case, the receiver (LNA 310 and mixer 318) can be set 606 to low linearity at their lowest IP3 setting (and optionally set for low dynamic range for the analog filter block 320, A/D 322 and digital filter block 323) using current and/or gain control.

However, if interference power is found over the threshold in any of the bins, a next step includes determining 608 a frequency offset of the interferers. If the frequency offset (delta) between two interferers is a multiple, or particularly the same, as the delta between the nearest frequency interferer and the RX band, then there will be third-order interference products in the RX band that will lower the SIR of the receiver. If the frequency offsets are calculated 609 such that interference products will not fall in the RX passband, then interference is not considered a problem for device reception, and the receiver can be set 606 to low linearity (and optionally low dynamic range) using current and/or gain control. However, if the frequency offsets are calculated 609 such that interference products fall in the RX passband, then it is necessary to calculate the receiver linearity required to achieve a desired signal-to-interference ratio and adjust the receiver linearity calculated in the calculating step to achieve the desired signal-to-interference ratio. This is done in equation 2 by first setting 607 P1 to the power level of the interferer closest to the RX band and P2 to the power level of the interferer farthest from the RX band. Next 605, using the known or measured values of the required SIR 601 and the received desired signal $P_{sig}$ 603, a third order intercept point ($IP_3$) threshold can be calculated from equation 2, to produce the desired SIR, wherein the receiver (LNA 310 and mixer 318) can be set to an appropriate linearity (and optionally an appropriate dynamic range for the analog filter block 320, A/D 322 and digital filter block 323) using current and/or gain control. Increasing linearity can be achieved by either lowering a gain of the gain stage and mixer of the receiver, increasing current to the gain stage and mixer of the receiver, or both. This adjustment can also include the analog filter block.

Figure 7:
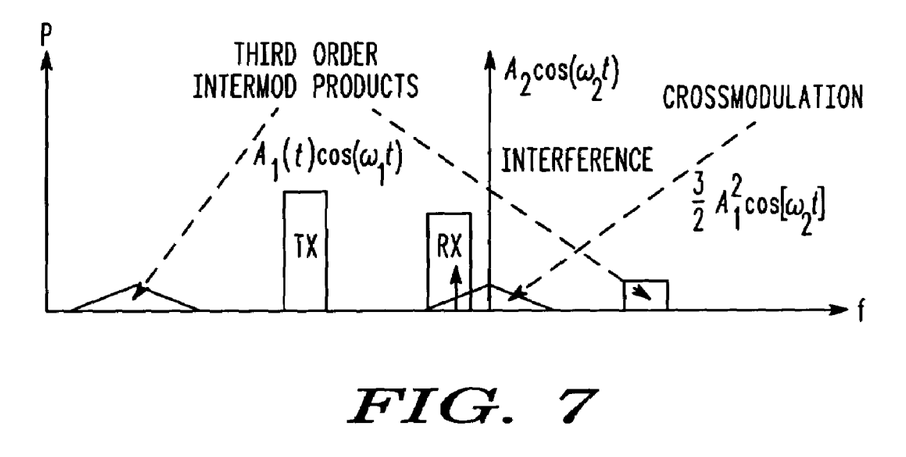
FIG. 7 is a flow chart for a method of reducing current drain in a receiver, in accordance with the present invention.

The present invention is also applicable to the mitigation of crossmodulation interference products. FIG. 7 shows a graph illustrating the effects of crossmodulation on a receiver (RX) band. In this example, a first interferer, $A_2 \cos(\omega_2 t)$, which is near to the RX band crossmodulates with leakage from the devices transmitter, $A_1(t)\cos(\omega_1 t)$, which results in wideband interference in the RX band. This crossmodulation produces non-linear distortions within the RX band that degrades signal-to-interference performance (as well as third-order products outside of the band). In particular, the interference from distortion is $$v_{cmd}(t) = 3/2 A_1^2(t) A_2 \cos(\omega_2 t) \qquad (3)$$

and the signal-to-interference ratio is $$\frac{P_{sig}}{P_{cmd}} = \frac{P_{sig}}{2P_1 + P_2 - 2IP_3 + 6 + AF + AM} \qquad (4)$$

where $P_{sig}$ is the power of the desired in-band (RX) signal and $P_{cmd}$ is the power of the interference. $P_1$ is the power level of the transmitter, and $P_2$ is the power level of the interferer. In the present invention, the power and frequency offsets of the transmitter and interferer are known or measured directly to determine their effect within the RX band. In addition, a percent amplitude modulation of the transmitter can also be used to determine the proper linearity of the receiver. Moreover, an attenuation factor is defined due to the broadband nature of the crossmodulation as will be described below. With a given signal-to-interference ratio (SIR) limit (as defined in the standard), an $IP_3$ threshold can then be found to provide sufficient SIR. The components of the receiver can then have their linearity adjusted to provide sufficient SIR.

Referring back to FIG. 5, crossmodulation mitigation can be provided using spectral signal estimation combined with an attenuation factor (AF) to calculate the receiver linearity required, based on the measured interference and a desired SIR. The attenuation factor is predetermined for the receiver and defines measurement attenuation per offset from the RX band and relates to correction of out-of-band power measurements. In particular, it should be noted that the attenuation factor captures the fact that the crossmodulation decreases with the offset frequency of the interference. This fact allows the reduction our current/linearity based upon the knowledge of the frequency offset of the interference. If there is no interference in the 2 to 7 MHz frequency range, then the receiver can operate with minimal linearity independent of the amount of TX signal as long as the crossmodulation and/or the intermodulation requirements are met.

The crossmodulation solution finds best application in a multimode GSM and WCDMA communication system or multimode AMPS and cdma2000 communication systems. Multimode systems often involve the deployment of the two modes in the same frequency band thus leading to interference that produces crossmodulation.

As represented in FIG. 5, the DSP module (308 in FIG. 3) can also be used to detect crossmodulation distortion, in accordance with the present invention. In this case, the non-linear distortion that is produced is wideband due to the crossmodulation of the wideband TX signal. The DSP uses inputs of the known transmitter (TX) power, modulation and frequency along with the received signals level ($P_{sig}$) as well as the required SIR. Then, given the measurements of the interferer and knowledge of the transmitter, can calculate an $IP_3$ threshold from equation 4, to produce the desired SIR. In particular, the present invention uses spectral estimation to decide if any significant crossmodulation products from wideband interference will fall inside the receive channel filter. The dynamic range of the A/D converter and digital baseband can be relaxed if the spectral estimation indicates that no interference exists As before, interference is detected through the wideband A/D by measuring a spectrum across and outside of the RX band. In particular, the signal out from the A/D is passed to a digital lowpass filter that reduces the frequency range of detection for crossmodulation and to reduce quantization noise of the A/D. This signal is then passed to a digital highpass filter that is the inverse of the analog low pass filter (320) to equalize the signal amplitude. This received signal spectrum can be provided through a Fast Fourier Transform (FFT) or through a bank of bandpass filters (BPF) covering the desired spectrum. The FFT size or BPF bandwidth is set by a desired frequency resolution, and the number of points can be set by the desired frequency range. In addition, many other techniques known in the art can be used to provide this spectrum measurement. Additionally, other methods exist to equalize the signal amplitude such as simple addition of the inverse analog low pass filter (320) transfer function after spectral estimation. In this example, a set of twenty-four bandpass filters are used to cover the range of the spectrum to find the interference. The power levels and frequency offsets of the interferer and transmitter are used in by the DSP in equation 4, to calculate the proper linearity (predetermined empirically) of the receiver components to provide at least a minimum SIR for proper reception by the communication device. Linearity is adjusted by either or both of a current control and gain control to the mixer and/or amplifier, thereby mitigating the waste of battery current.

In a preferred embodiment, if the signal level in the various receiver components is reduced (i.e. lower signal swing), there is no need to provide full dynamic range in the various components of the receiver to accommodate this reduced signal. Therefore, in the present invention, the dynamic range of these components can be reduced to track the linearity requirements of the LNA and mixer to further save current. In particular, current control can be used to control the dynamic range of one or more of the analog filter block (320), A/D (322) and digital filter block (323).

Figure 8:
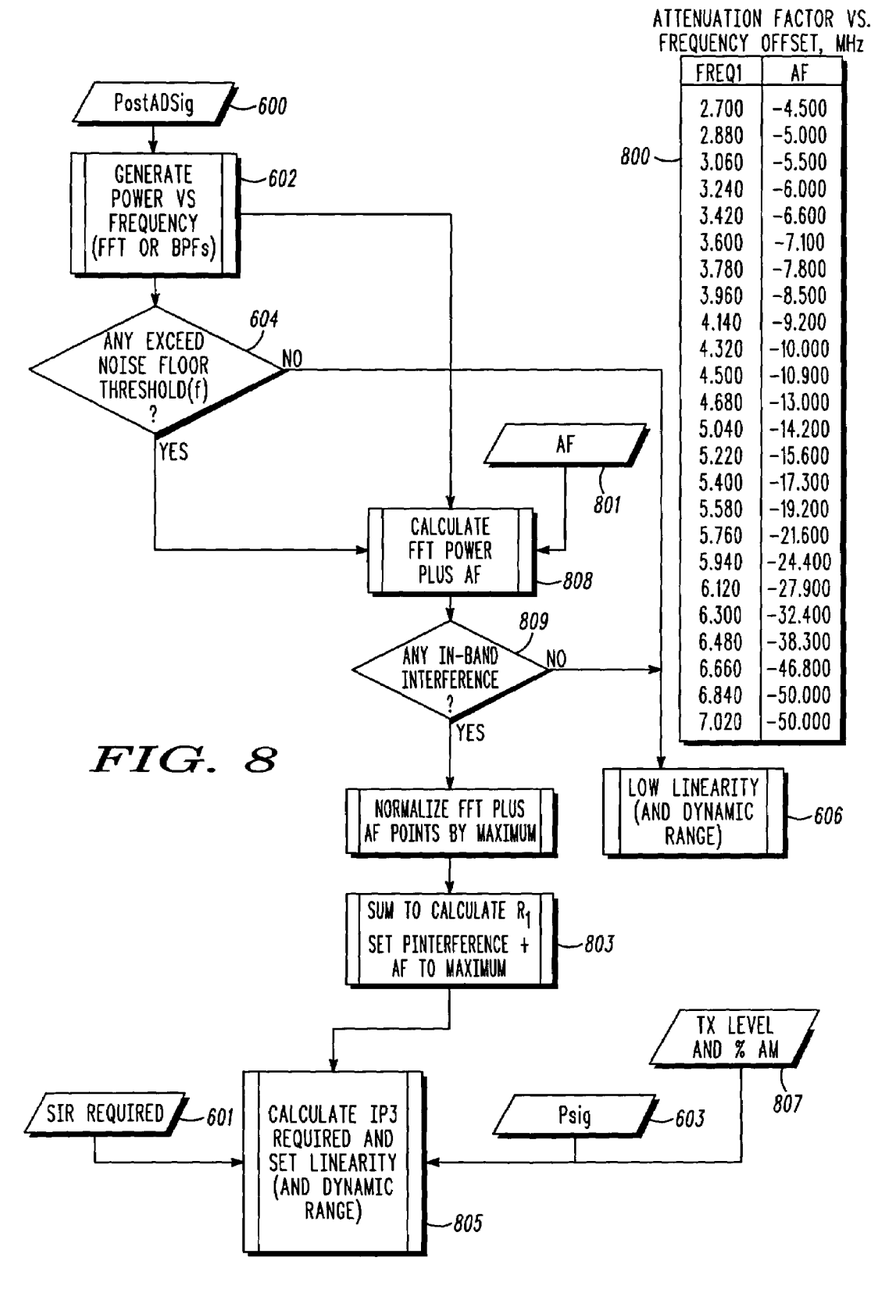
FIG. 8 illustrates a method to mitigate the effects of crossmodulation distortion, in accordance with the present invention.

FIG. 8 illustrates a method to mitigate the effects of crossmodulation distortion, in accordance with the present invention. Referring to FIGS. 3, 5, 7 and 8, a first step 800 includes inputting the wideband signal from the A/D 322. From this signal, a noise power spectrum is generated 602 using FFT or a bank of BPFs as described above. The noise power spectrum can be determined under many conditions including during periods of non-communication with the receiver, during periods with the transmitter on (or off), and during several periods using an average of several measurements. A next step 604 includes detecting any interference products, which are found by measuring if any of the FFT bins or bandpass filters in the bank have a noise power level above a predetermined threshold indicating interference is present. The predetermined threshold is determined empirically from the final linearity requirements of the receiver. The threshold can be a constant level or a curve tailored for the particular RX band. The threshold can also be different for intermodulation and crossmodulation problems. If none of the bins of filters present an interference noise power over the threshold, then interference is not considered a problem for device reception. In this case, the receiver (LNA 310 and mixer 318) can be set 606 for low linearity at their lowest IP3 setting (and optionally set for low dynamic range for the analog filter block 320, A/D 322 and digital filter block 323) using current and/or gain control.

However, if interference power is found over the threshold in any of the bins, a next step includes determining 808 a frequency offset of the interferer, which is used in combination with the corresponding input attenuation 801 from a predetermined lookup table 800 along with the measured power. If the frequency offset of the interferer is close enough to the RX band (e.g. within 7 MHz for WCDMA), then there can be crossmodulation interference products in the RX band that will lower the SIR of the receiver. If the interference products are calculated 809 such that interference products will not fall in the RX passband, then interference is not considered a problem for device reception, and the receiver can be set 606 to low linearity (and optionally low dynamic range) using current and/or gain control.

However, if the interference products are calculated 609 such that interference products will fall in the RX passband, then it is necessary to calculate the receiver linearity required to achieve a desired signal-to-interference ratio and adjust the receiver linearity calculated in the calculating step to achieve the desired signal-to-interference ratio. Due to the broadband nature of the interference, the FFT bins and AF points are normalized 802 with reference to the maximum value of the highest power bank that exceeds the noise spectrum threshold. Then the bin values are summed 803 to determine a normalized total crossmodulation contribution, R, for equation 4, and $P_2$ and AF are set to the level of the maximum interferer, i.e. normalized to maximum. Next 805, using the known or measured values of the required SIR 601, the received desired signal $P_{sig}$ 603, and a TX power level and percent amplitude modulation 807, a third order intercept point ($IP_3$) threshold can be calculated from equation 4, to produce the desired SIR, wherein the receiver (LNA 310 and mixer 318) can be set to an appropriate linearity (and optionally an appropriate dynamic range for the analog filter block 320, A/D 322 and digital filter block 323) using current and/or gain control. Increasing linearity can be achieved by either lowering a gain of the gain stage and mixer of the receiver, increasing current to the gain stage and mixer of the receiver, or both.

It should be recognized that the techniques described above can be repeated periodically to update the operating condition of the device based on changes in the interference. In addition, the DSP module 308 can adjust the gain stage, mixer, A/D and filter blocks differently depending on interference conditions and the capability of each element.

Advantageously, the present invention addresses non-linear distortions directly and separately from noise and interference than is done in the prior art. This is accomplished with existing hardware eliminating the need for additional circuitry hence saving space on the printed circuit board and within the integrated circuits. The ever-increasing capabilities of digital signal processor technology allows for the simultaneous measurements and operation of different modes of the communication signal to provide seamless control with very small chip die areas.

As can be seen from the foregoing, the present invention provides a method and apparatus for reducing the current drain in a communication device by making the elements in the receiver (amplifiers and down converters) less linear or with less dynamic range when there is minimal interference, and increasing linearity or dynamic range again when the interference is significant. The present invention can also advantageously be applied to control, data and paging communication in addition to the traffic channel that is described above. During these events the receiver linearity can be adjusted in the same manner described previously.

The present invention involves taking advantage of the enhanced dynamic range of a wideband A/D converter to provide a novel technique to detect interference. Using techniques such as FFTs or a bank of band pass filters, the present invention allows the detection of the presence of interference, the power of interference, and the frequency offset of the interference. The useful range of frequency offset detection is limited by the sigma delta A/D noise floor and the attenuation of the analog baseband filter. Simulation results demonstrate that signals in the 2 to 7 MHz offset range, with amplitudes from −60 dBm to the compression point, can be detected. This is very important since the 7 MHz point is the frequency offset at which the crossmodulation is no longer an issue for WCDMA due to the frequency offset from the receiver. Furthermore, narrowband intermodulation tests performed as part of the WCDMA and CDMA standards both fall within this frequency offset range.

The use of a simple yet more sophisticated detection of the present invention adds two novel features. One, the receiver linearity of the RF elements can be adjusted based not just on a quality metric as in the prior art but on actual measurements of interference, both power and frequency offset, and calculation of linearity requirements based on the interference. Two, the use of this detector can be used to reduce the dynamic range of the A/D and digital filter based on the amount of interference present. This provides the most efficient use of the linearity/dynamic range of the various receiver components.

Although the invention has been described and illustrated in the above description and drawings, it is understood that this description is by way of example only and that numerous changes and modifications can me made by those skilled in the art without departing from the broad scope of the invention. Although the present invention finds particular use in portable cellular radiotelephones, the invention could be applied to any multimode wireless communication device, including pagers, electronic organizers, and computers. Applicants' invention should be limited only by the following claims.

What is claimed is:

1. A method for reducing current drain in a communication device, the method comprising the steps of:
   detecting interference;
   determining a frequency offset of the interference;
   measuring a power level of the interference;
   calculating a receiver linearity required to achieve a desired signal-to-interference ratio; and
   adjusting the receiver linearity calculated in the calculating step to achieve the desired signal-to-interference ratio.

2. A method as recited in claim 1, further comprising the step of operating the communication device in a code division multiple access (CDMA) system.

3. A method as recited in claim 1, wherein the determining step includes estimating a signal spectrum of the interference products to determine the frequency offset of interference products and whether interference products are present within a receiver passband.

4. A method as recited in claim 1, wherein the determining step includes estimating a signal spectrum of the interference products to determine the frequency offset of interference products and whether interference products exceed a noise spectrum threshold within a receiver passband.

5. A method as recited in claim 1, wherein the measuring step includes an attenuation factor of the receiver at the frequency offset.

6. A method as recited in claim 1, wherein the adjusting step includes adjusting an analog-to-digital converter dynamic range to a level corresponding to the adjusted receiver linearity.

7. A method as recited in claim 1, wherein the measuring step includes measuring a transmit power level and frequency offset of the communication device, and wherein the desired signal-to-interference ratio of the calculating step is dependent upon the transmit power level and frequency offset.

8. A method as recited in claim 1, wherein the adjusting step include setting at least one of the group of current and gain to the receiver at a minimum level sufficient to achieve the desired signal-to-interference ratio.

9. A method as recited in claim 1, wherein the adjusting step include setting at least one of the group of current and gain to the receiver at a minimum level sufficient to achieve the desired linearity and dynamic range for the desired signal-to-interference ratio.

10. A communication device with reduced current drain, the communication device comprising:
 a transmitter operable at a variable transmit power level;
 a receiver operable with variable linearity; and
 a control circuit coupled to the transmitter and receiver, the control circuit operable to detect interference and control the receiver linearity, wherein if interference is detected the control circuit;
 determines a frequency offset of the interference;
 measures a power level of the interference;
 calculates a receiver linearity required to achieve a desired signal-to-interference ratio; and
 adjusts the receiver linearity to achieve the desired signal-to-interference ratio.

11. A communication device as recited in claim 10, wherein the control circuit estimates a signal spectrum of the interference products to determine whether interference products exceed a noise spectrum threshold within a receiver passband.

12. A communication device as recited in claim 10, wherein the control circuit adjusts a dynamic range of the receiver in accordance with the adjusted receiver linearity.

13. A communication device as recited in claim 10, wherein the control circuit adjusts at least one of the group of current and gain to the receiver at a minimum level sufficient to achieve the desired signal-to-interference ratio.

14. A communication device as recited in claim 10, wherein the control circuit calculates a third-order intercept point threshold to provide sufficient signal-to-interference and sets at least one of the group of current and gain to the receiver at a level sufficient to at least meet the third-order intercept point threshold.

* * * * *